US007000620B2

(12) United States Patent
Thomas et al.

(10) Patent No.: US 7,000,620 B2
(45) Date of Patent: Feb. 21, 2006

(54) DISHWASHER FLOAT MOUNTING BRACKET WITH RETAINER COVER

(75) Inventors: Chad M. Thomas, Jackson, TN (US); Brook J. Beaston, Jackson, TN (US); Michael C. Simmons, Moscow, TN (US)

(73) Assignee: Maytag Corporation, Newton, IA (US)

(*) Notice: Subject to any disclaimer, the term of this patent is extended or adjusted under 35 U.S.C. 154(b) by 367 days.

(21) Appl. No.: 10/615,360

(22) Filed: Jul. 7, 2003

(65) Prior Publication Data

US 2005/0005951 A1 Jan. 13, 2005

(51) Int. Cl.
*B08B 7/00* (2006.01)
*H01H 35/18* (2006.01)
*G01F 23/56* (2006.01)

(52) U.S. Cl. ................. 134/25.2; 134/56 D; 134/57 D; 134/58 D; 200/84 R; 73/322.5; 73/305; 73/308

(58) Field of Classification Search ............... 134/25.2, 134/56 D, 57 D, 58 D, 113, 176, 186; 200/84 R; 73/305, 308, 322.5; 137/429, 412, 387
See application file for complete search history.

(56) References Cited

U.S. PATENT DOCUMENTS 3,643,681 A 2/1972 Simmons
3,721,783 A 3/1973 Hancock
3,829,636 A 8/1974 Scott
3,894,555 A 7/1975 Payne
4,180,095 A 12/1979 Woolley et al.
4,289,154 A 9/1981 Quayle
5,018,550 A 5/1991 Burdoff
5,365,969 A 11/1994 Edwards
6,559,397 B1 * 5/2003 Beaston .................... 200/84 R

* cited by examiner

*Primary Examiner*—Michael Barr
*Assistant Examiner*—Saeed Chaudhry
(74) *Attorney, Agent, or Firm*—McKee, Voorhees & Sease, P.L.C.

(57) ABSTRACT

A float mounting plate is provided for a dishwasher to limit the level of water in the dishwasher tub. The float has a stem extending downwardly through a stand pipe in the bottom of the tub and into a switch bracket which houses the water level control switch. A tab is provided on the switch bracket which is adapted to extend around the float stem, thereby slidably retaining the retainer ring of the stem for engagement and disengagement with the switch, and limiting lateral or horizontal movement of the stem. In one embodiment, the tab is integrally formed with the bracket, with a living hinge allowing the tab to pivot between open and closed positions. In a second embodiment, the tab snap fits onto the bracket to capture the float stem.

18 Claims, 3 Drawing Sheets

DISHWASHER FLOAT MOUNTING BRACKET WITH RETAINER COVER

BACKGROUND OF THE INVENTION

Dishwashers generally include a float in the bottom of the tub which is adapted to actuate a switch to control the water level in the tub. The float includes a stem extending through the tub for engaging and disengaging with an actuator arm on the switch, which resides outside of the tub. Typically a nut is threaded onto the end of the float stem to retain the stem in position outside the tub. Since the stem is in a small or tight location, assembly of the nut onto the stem is a difficult and time consuming assembly task. Another problem in the prior art is the disengagement of the float stem from the switch actuator arm, which makes the switch inoperative.

Accordingly, a primary objective of the present invention is the provision of an improved float mounting plate for a dishwasher float.

Another objective of the present invention is the provision of a float switch bracket which securely retains the float stem in position on the switch actuator arm.

Yet another objective of the present invention is the provision of a float switch bracket which precludes disengagement of the float stem from the switch actuator arm.

Another objective of the present invention is the provision of an improved switch bracket with a float mounting plate for controlling the water level in an appliance.

Another objective of the present invention is the provision of a method of retaining a float in a dishwasher tub so as to control the water level in the tub.

Still another objective of the present invention is the provision of a dishwasher float mounting plate having a snap fit tab for quickly and easily retaining the float stem.

A further objective of the present invention is the provision of a dishwasher float mounting plate which is economical to manufacture and easy to install.

These and other objectives will become apparent from the following description of the invention.

SUMMARY OF THE INVENTION

A float mounting plate with cover is provided for a dishwasher. The float mounting plate is integrally formed as a component of the float switch bracket mounted on the bottom of the tub of the dishwasher. In one embodiment, the float mounting plate includes a tab hinged to one end of the switch bracket to retain the float stem. In another embodiment, the tab is separate from the bracket and snap fits onto the bracket to capture the float stem.

The method of retaining the float in the dishwasher tub for controlling the water level in the tub includes the steps of positioning the float in the tub, inserting the stem of the float through a stand pipe in the tub for receipt in the switch bracket mounted beneath the tub, and capturing the stem in a tab on the switch bracket so that the stem is slidably retained by the tab and in the stand pipe. Thus, the float is initially in a lower position wherein the stem engages the switch actuation arm, and is free to rise as the water level of the tub rises, until the stem disengages the switch actuation arm.

DETAILED DESCRIPTION OF THE INVENTION

Figure 1:
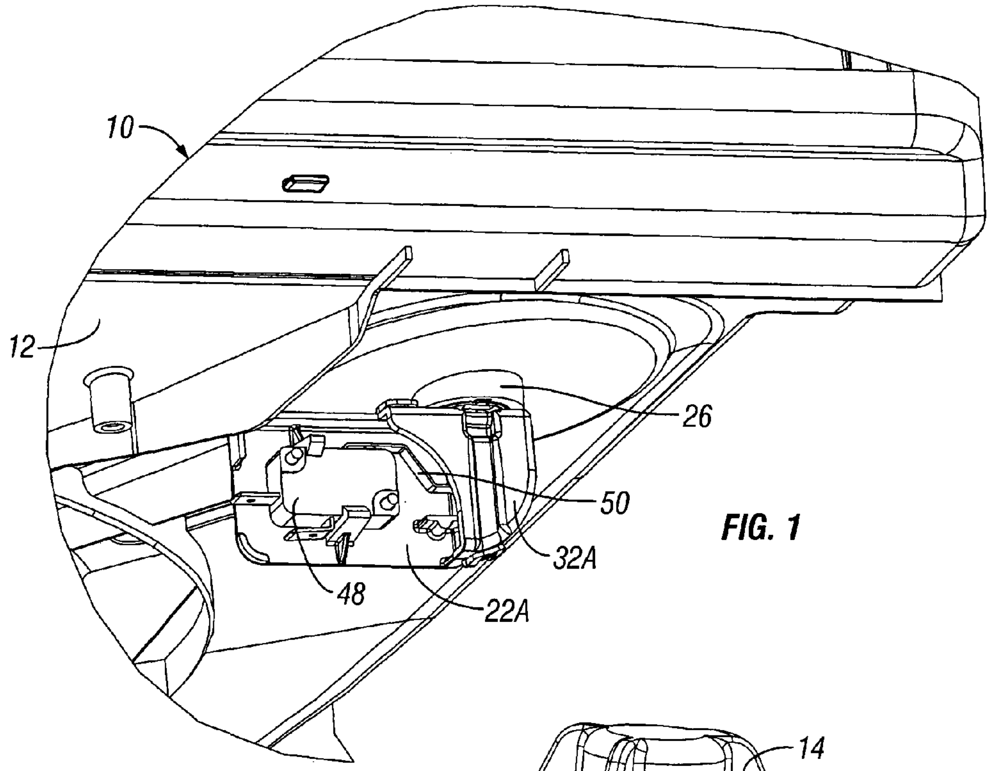
FIG. 1 is a partial perspective view showing a first embodiment of the dishwasher float mounting plate of the present invention mounted on the bottom of the tub with the stem of the float retained therein, with the retainer tab being in a closed position.

A dishwasher tub is generally designated in the drawings by the reference numeral 10. The tub 10 has a bottom wall 12 in which is mounted a float 14 to control the water level in the tub 10.

The float 14 includes a body 16 with a stem 18 extending downwardly from the body 16. The stem 18 extends downwardly through a stand pipe (not shown) formed in the bottom 12 of the tub 10. The upper end of the stand pipe resides above the water level in the tub 10, so as to preclude water from draining through the stand pipe.

Figure 2:
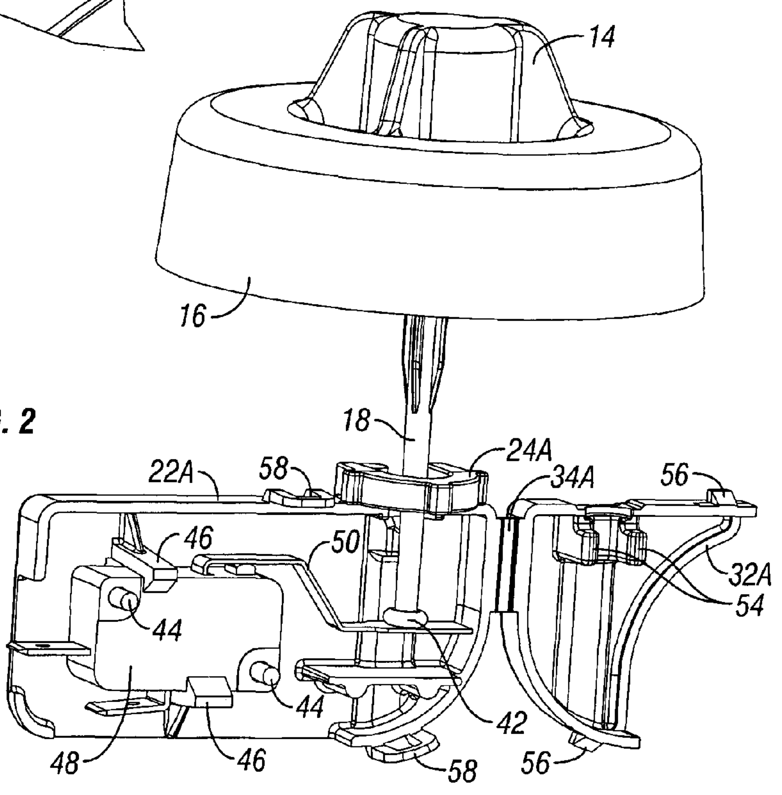
FIG. 2 is a perspective view showing the first embodiment float mounting plate and the float, with the retainer tab being in an open position.
Figure 3:
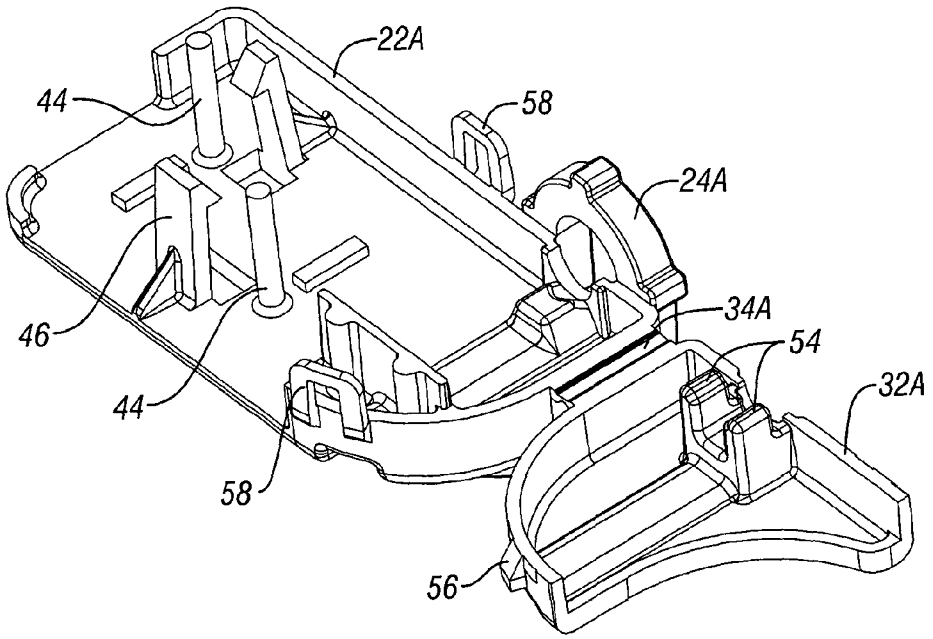
FIG. 3 is a perspective view of one side of the float retainer of the first embodiment.
Figure 4:
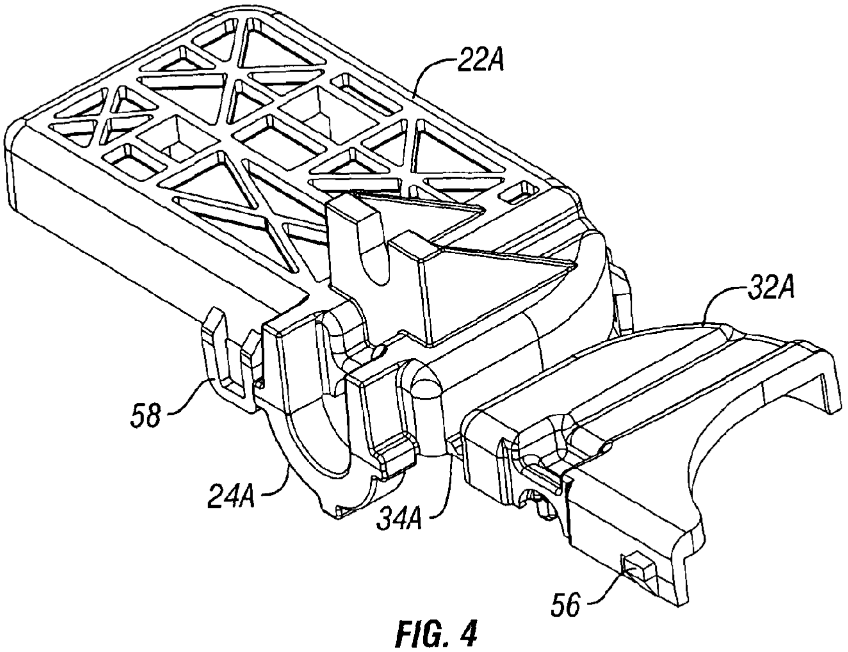
FIG. 4 is a view similar to FIG. 3 showing the opposite side of the first embodiment of the float retainer.
Figure 5:
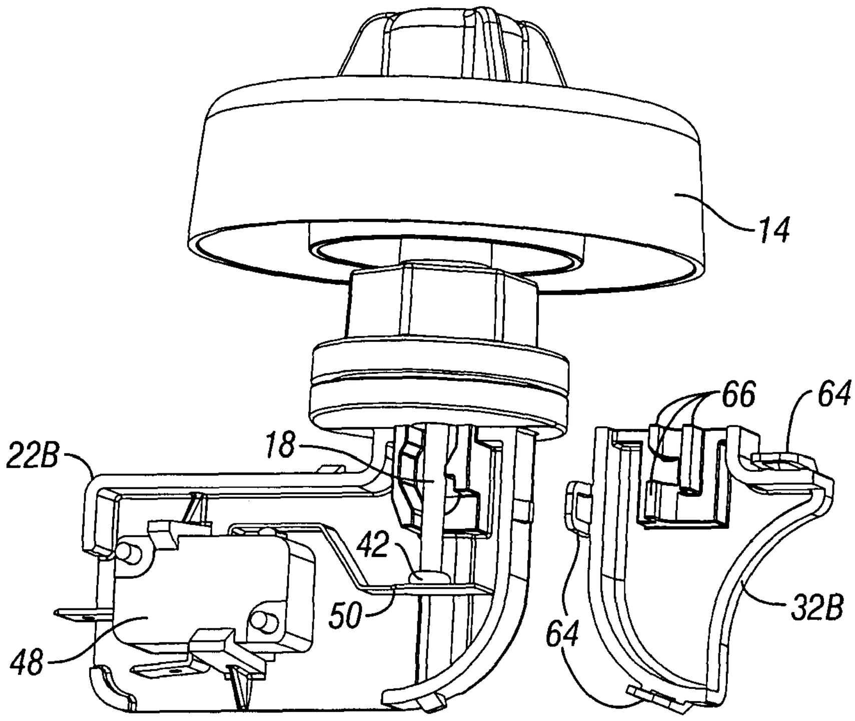
FIG. 5 is a perspective view of a second embodiment of the dishwasher float mounting plate and retainer tab according to the present invention.

A switch bracket 22A is mounted to the bottom 12 of the plastic tub 10 in any convenient manner. As shown in FIG. 2, in the preferred embodiment, a mounting ring 24A is formed on the top of the bracket 22A. The ring 24A is adapted to be press fit onto the fitting 26 on the bottom 12 of the plastic tub 10. The bracket 22A also includes mounting pins 44 and retainer clips 46 for mounting and retaining a switch 48. The switch 48 includes an actuator arm or lever 50 which extends beneath the float stem 18, as best seen in FIGS. 2 and 5. The actuator arm 50 is normally biased to a raised or upward position.

The bracket 22A includes an enlarged retainer tab or cover 32A which is integrally formed with the bracket 22A and connected thereto by a living hinge 34A. The tab 32A is movable between the open position shown in FIG. 2 and the closed position shown in FIG. 1. The tab 32A includes a pair of spaced apart fingers 54 which extend on opposite sides of the stem 18 when the tab 32A is closed. The space between the fingers 54 is greater than the diameter of the stem 18, but less than the diameter of the retainer ring 42 at the bottom of the stem 18. Therefore, the float 14 is free to move upwardly and downwardly in response to changing water level in the dishwasher tub, but cannot be removed from the bracket 22A when the tab 32A is closed. In addition, when the retainer tab 32A is closed, the float stem 18 cannot laterally disengage from the actuator arm 50 of the switch 48. The tab 32A of the bracket 22A is held in the closed position by a pair of detents 56 which snap fit into corresponding ears 58 on the bracket 22A.

Figure 6:
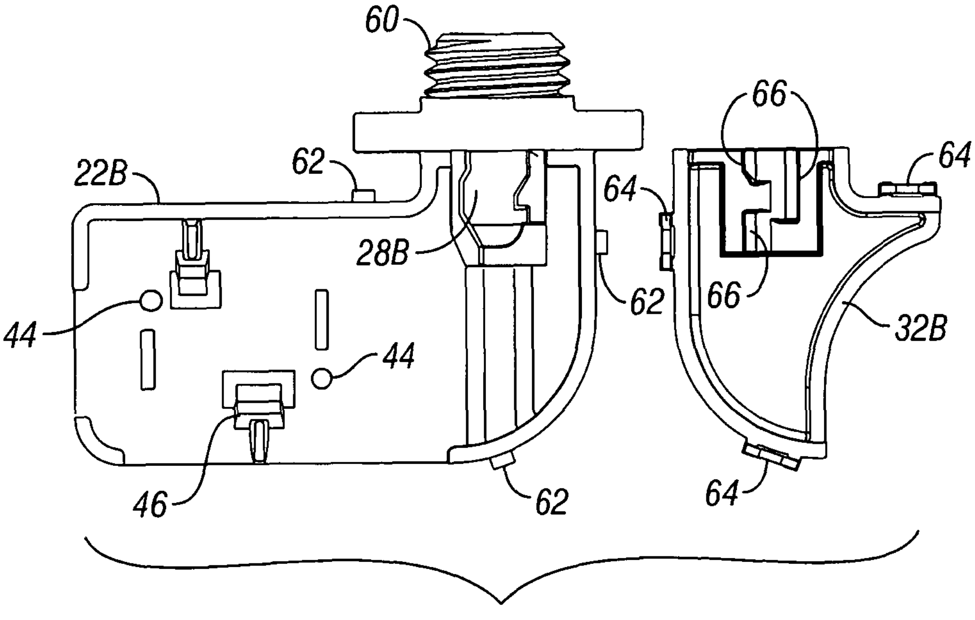
FIG. 6 is a front elevation view of the mounting plate and retainer tab shown in FIG. 5.

A second embodiment of the float mounting plate of the present invention is shown in FIGS. 5 and 6, and the switch bracket is generally designated by the reference numeral 22B. The same reference numerals are used to designate the elements, as with bracket 22A shown in FIGS. 1–4. The bracket 22B is adapted to hold the switch 48 via the mounting pins 44 and retainer clips 46.

The bracket 22B includes a threaded neck 60 adapted to be threadably mounted in a threaded aperture formed in a separate stand pipe 20B to mount the switch bracket 22B to the bottom of a stainless steel tub. The retainer tab or cover 32B is adapted to snap fit onto the bracket 22B. Detents 62 are provided on the bracket 22B to snap fit into ears 64 on the retainer tab 32B.

The bracket 22B includes a collar 28B which extends downwardly from the neck 60 and is axially aligned therewith. The stem 18 of the float 14 slideably extends through the collar 28B for engagement with the switch actuator arm 50. The retainer tab 32B includes fingers 66 which extend on opposite sides of the stem 18 when the tab 32B is closed. Space between the fingers 66 is greater than the diameter of the stem 18, but less than the diameter of the retainer ring 42 at the bottom of the stem 18. Therefore, the float 14 is free to move upwardly and downwardly in response to changing water level in the dishwasher tub, but cannot be removed from the bracket 22B when the tab 32B is closed, and the float stem 18 cannot laterally disengage from the actuator arm 50 of the switch 48.

When there is no water in the tub 10, the float 14 will be in a lower position with the stem 18 depressing the actuator arm 50 of the switch 48, which allows water to be added to the tub 10. When the water reaches a predetermined level in the tub 10, the float 14 will rise sufficiently so that the stem 18 disengages the actuator arm 50 of the switch 48, such that the switch 48 is de-actuated.

In assembling the switch bracket 22A or 22B and float 14 according to the method of the present invention, the switch bracket 22A or 22B is mounted onto the bottom 12 of the tub 10. The stem 18 of the float 14 is then inserted into the stand pipe, and allowed to drop to a position wherein the retainer ring 42 is below the fingers 54 of tab 32A or fingers 66 of tab 32B. The retainer tab 32A is then pivoted from the open position to the closed position on the switch bracket 22A so that fingers 54 surround the stem 18, or retainer tab 32B is snap fit onto switch bracket 22B. The switch 48 is mounted over the pins 44 and secured by the clips 46, with the actuator arm 50 extending beneath the stem 18 of the float 14.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A float retainer for a dishwasher, the dishwasher including a tub, a float with a stem extending through a standpipe in the tub, the stem being adapted to engage and disengage a switch mounted in a switch bracket to control the water level in the tub, the float retainer comprising:

a tab on the bracket movable between open and closed position, the tab having fingers adapted to slidably retain the stem when the tab is in the closed position.

2. The float retainer of claim 1 further comprising a hinge connecting the tab to the bracket.

3. The float retainer of claim 2 wherein the hinge is a living hinge.

4. The float retainer of claim 1 wherein the tab and bracket are integrally formed.

5. The float retainer of claim 1 wherein the tab fingers capture the stem to prevent the float stem from laterally disengaging from the switch.

6. An improved switch bracket for housing a switch to control the water level in an appliance, the appliance having a float with a stem extending through a standpipe, the stem being adapted to engage and actuate the switch beneath the standpipe, the improvement comprising:

a tab on the switch bracket having fingers through which the stem extends to slidably retain the stem in the standpipe.

7. The improved switch bracket of claim 6 further comprising a hinge to pivotally connect the tab to the bracket for movement of the tab between open and closed positions.

8. The improved switch bracket of claim 7 wherein the hinge is a living hinge.

9. The improved switch bracket of claim 7 wherein the tab fingers capture the stem when the tab is in the closed position.

10. The improved switch bracket of claim 6 wherein the tab is formed integrally with the switch bracket.

11. The improved switch bracket of claim 6 wherein the tab snap fits onto the bracket.

12. The improved switch bracket of claim 6 wherein the bracket includes a threaded neck to mount onto the appliance.

13. The improved switch bracket of claim 6 wherein the tab fingers capture the stem to preclude lateral movement of the float stem.

14. A method of retaining a float in a dishwasher tub for controlling the water level in the tub, comprising:

inserting a stem of the float through a stand pipe in the tub for receipt in a switch bracket beneath the tub; and capturing the stem between fingers on a tab on the switch bracket for sliding retention of the float in the stand pipe.

15. The method of claim 14 wherein the tab is pivoted from a first position to a second position wherein the tab captures the stem.

16. The method of claim 15 wherein the tab is retained in the second position by snap fitting onto a lip on the switch bracket.

17. The method of claim 14 wherein the tab is snap fit onto the bracket.

18. The method of claim 14 further comprising limiting horizontal movement of the float stem with the tab fingers.

* * * * *